United States Patent [19]

de la Taille et al.

[11] 4,046,420
[45] Sept. 6, 1977

[54] CHILD'S SAFETY CHAIR

[75] Inventors: Olivier de la Taille, Etampes; Armand Bernard, Mespuits; Jean-Francois Labadie, Etampes, all of France

[73] Assignee: Societe Industrielle Bertrand Faure, Etampes, France

[21] Appl. No.: 630,048

[22] Filed: Nov. 7, 1975

[30] Foreign Application Priority Data

Nov. 18, 1974 France .................................. 74.37989

[51] Int. Cl.² ........................................... B60R 21/00
[52] U.S. Cl. ..................................... 297/216; 297/386
[58] Field of Search ............. 297/216, 390, 386, 384; 312/111; 280/744, 748, DIG. 1

[56] References Cited

U.S. PATENT DOCUMENTS

| 2,386,343 | 10/1945 | Regenhardt | 312/111 |
| 3,784,224 | 1/1974 | Peeler | 280/746 |
| 3,901,550 | 8/1975 | Hamy | 297/390 |
| 3,922,030 | 11/1975 | Stedman | 297/216 X |
| 3,957,303 | 5/1976 | Mauron | 297/250 X |

FOREIGN PATENT DOCUMENTS 2,147,248  3/1973  Germany ...................... 219/216

Primary Examiner—James T. McCall
Attorney, Agent, or Firm—Oblon, Fisher, Spivak, McClelland & Maier

[57] ABSTRACT

A child's safety seat is provided which incorporates a seat body part to be firmly connected to a vehicle seat, a child-retaining means having side walls which bear against side walls of the seat body part and energy absorbing means interposed between the seat body part and the child-retaining means.

7 Claims, 10 Drawing Figures

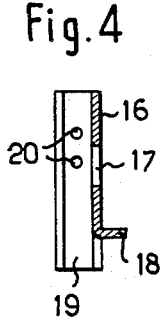
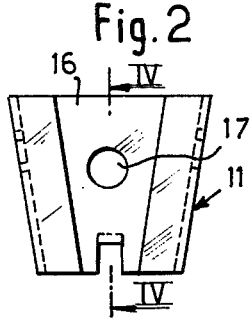
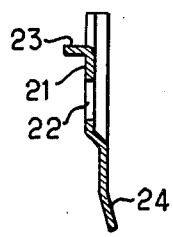
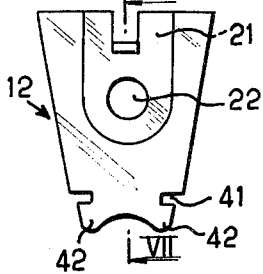
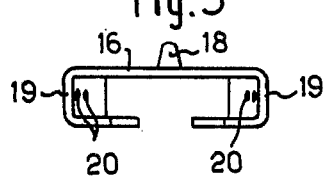
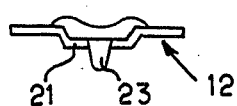
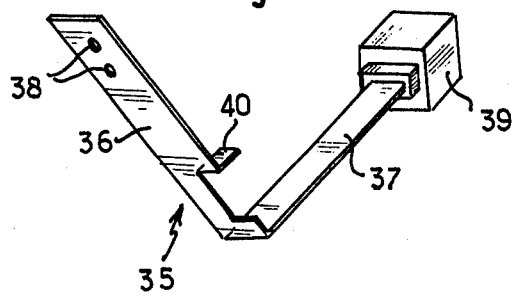
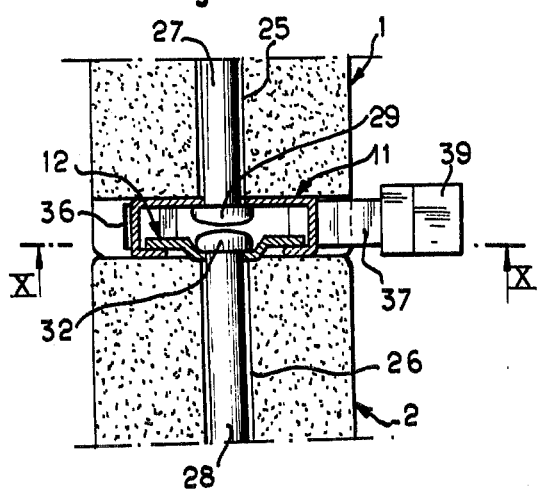
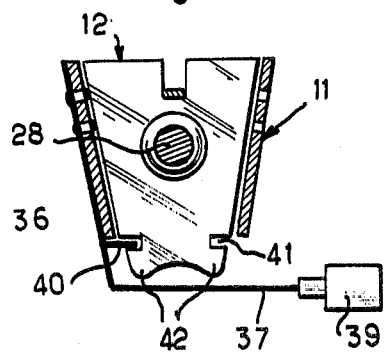

CHILD'S SAFETY CHAIR

BACKGROUND OF THE INVENTION

1. Field of the Invention

The present invention relates to a child's safety seat comprising a seat body part adapted to be firmly connected to a vehicle seat, a child-retaining means, the side walls of which bear against the side walls of the seat body part, and energy-absorbing means interposed between the seat body part and the child-retaining means and adapted to become effective to protect a child in the seat in the event of a sudden deceleration of the vehicle in which the seat is mounted.

2. Description of the Prior Art

In the known safety seats of this type, the energy-absorbing means also perform the function of firmly securing the child-retaining means and the seat body part. However, the fitting of these means, which is usually difficult, results in the securing operation being lengthy and awkward. Furthermore when the energy absorbing means are in position, their presence complicates separation of the retaining means from the seat part.

The advantage of children's safety seats, comprising a seat body part and child-retaining means separable therefrom for the purpose of, on the one hand, facilitating the installation of a child and, on the other, storing the chair, for example, in the boot of a vehicle, is consequently offset by the presence of these energy-absorbing means.

SUMMARY OF THE INVENTION

The present invention is aimed at overcoming this disadvantage and, for this purpose, its object is to provide a child's safety seat in which the child-retaining means and the seat body part can be connected to and separated from each other in a simple and rapid manner, despite the presence of the energy-absorbing means.

The present invention provides a child's safety seat comprising: a seat body part adapted to be firmly connected to a vehicle seat; a child-retaining means, the side walls of which bear against the side walls of the seat body part; and energy-absorbing means interposed between the seat body part and the retaining means for protecting a child in the seat in the event of sudden deceleration of the vehicle, said energy-absorbing means comprising at least two similar assemblies, each of which includes two energy-absorbing members, one of which members is housed in a side wall of the seat body part and the other in the corresponding side wall of the child-retaining means, each of said two members being provided with coupling means for coupling them together and said coupling means being located at the bearing faces of the associated side wall of the seat body part of child-retaining means.

In a preferred arrangement, two superposed assemblies are provided at each side of the seat, and this not only enables the retaining means and the seat body part to be interconnected more firmly, but also results in a child being held in the seat more safely.

In this preferred arrangement the means for coupling the energy-absorbing members are so housed that when the members are coupled, the bearing faces of the side walls of the seat body part and of the child-retaining means are in contact. Furthermore, to facilitate the connection or separation of the respective energy-absorbing members of each assembly, the coupling means are preferably constituted by a tapered slide or shoe having a downwardly converging profile, a larger open end of which faces upwards, and by a correspondingly tapered plate or foot adapted to slot downwardly into the shoe. Advantageously, the shoe and foot may each be provided with at least one tab which projects into the respective side wall of the seat body part or the child-retaining means that carries the shoe or foot. The risk of the shoe and foot becoming displaced, even slightly, in relation to the bearing faces of the seat body part and the child-retaining means can thus be eliminated and the coupling of the shoe and foot can therefore always be satisfactorily achieved.

In one particular embodiment, the energy-absorbing members of each assembly comprise two longitudinal channels, one formed in a side wall of the seat body part and the other in the corresponding side wall of the child-retaining means, and by two rods, each fitted into a respective one of the channels. One of the ends of each of these rods retains a respective shoe or foot on the bearing face of the corresponding side wall, while the other end of the rod carries a bush of greater cross-section than that of the rod and housed in a widened portion of the associated channel. When a child is seated in the seat in a vehicle and the vehicle suddenly decelerates, the child's body will tend to fall against the child-retaining means and the latter will tend to become separated from the seat part. However, the bushes rub firmly against the walls of the longitudinal channels and thus brake movement of the child-retaining means relative to the seat body by absorbing a large proportion of the kinetic energy of the child's body.

Preferably, certain of the coupling means are provided with a locking element for preventing unintentional disengagement of the shoe and foot. Such locking means may suitably comprise a resilient strip having two arms bent substantially at right-angles to each other, one of the arms of this strip being secured along a side face of the associated shoe, whereas the other arm, which is free and terminates in a grip for operating the locking means manually, extends below said shoe. Said first arm is provided with a tab adapted to co-operate with a notch formed in a lower portion of the foot. This lower portion of the foot is adapted to project out of the narrow end of the shoe and has a curved zone which deflects the tab during coupling. The risk of accidental separation of the child-retaining means and the seat body part is thus eliminated.

BRIEF DESCRIPTION OF THE DRAWINGS

An embodiment of the present invention is illustrated by way of example in the accompanying drawings, in which:

FIG. 2 is a front view of a shoe having a downwardly converging profile;

FIG. 3 is a plan view of the shoe of FIG. 2;

FIG. 4 is a section on the line IV–IV of FIG. 2;

FIG. 5 is a front view of a foot;

FIG. 6 is a plan view of the foot shown in FIG. 5;

FIG. 7 is a section on the line VII—VII of FIG. 5;

FIG. 8 is a perspective view of a locking element;

FIG. 9 is a section showing a shoe, a foot and a locking element in the coupling position; and FIG. 10 is a section on line X—X of FIG. 9.

DETAILED DESCRIPTION OF A PREFERRED EMBODIMENT

Figure 1:
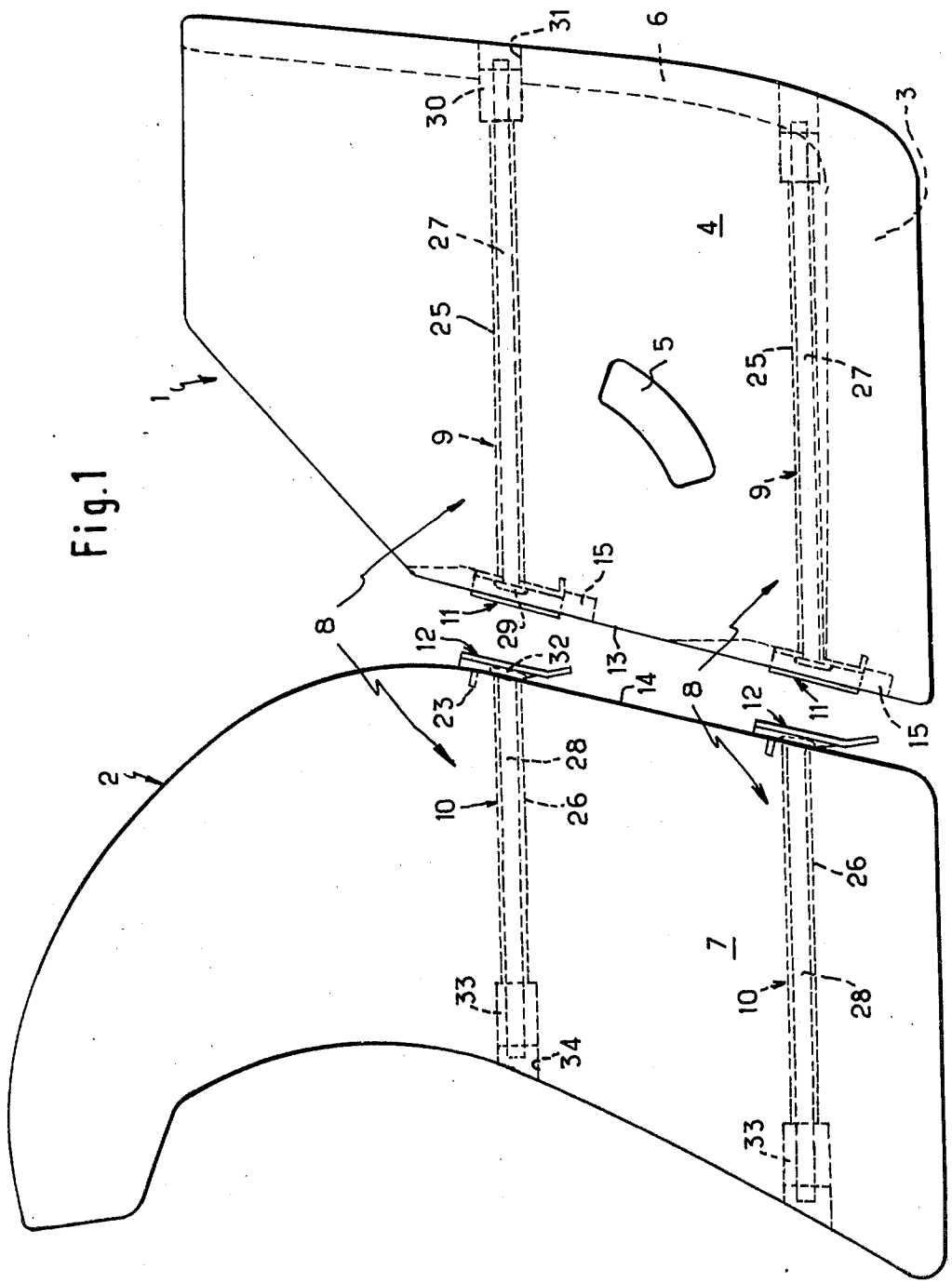
FIG. 1 is a side view of a child's safety seat in accordance with the invention, the child-retaining means being shown separated from the seat body part.

The child's safety seat in accordance with the invention comprises a seat body part 1, a child retaining means 2 and energy-absorbing means adapted to be interposed between the seat body part and the child-retaining means to protect a child in the seat in the event of a sudden deceleration of any vehicle within which the seat is located.

The seat body part 1 consists of a base 3 on which the child can be seated, two side walls 4, each containing an opening 5 through which a safety belt, not shown, can be passed for securing the seat body part to one of the seats of the vehicle, and a back-rest 6 adapted to bear against the back-rest of the vehicle seat after the seat body part has been secured in position.

The child-retaining means 2 comprises two side walls 7 adapted to bear against the side walls of the seat body part when the safety seat is in use. Furthermore, in known manner, the lower portions of these side walls contain an opening, not shown, through which the child's legs can pass, and the side walls are joined at their median zone so as to retain the child in the event of an impact of the child against the child-retaining means.

In the example illustrated, the energy-absorbing means comprise four similar assemblies 8, two assemblies being provided in the side walls of the safety seat (the side walls of the safety seat being constituted by the side walls of the seat body part and of the adjacent child-retaining means).

Referring in particular to FIG. 1, it will be seen that each assembly 8 comprises an energy-absorbing means 9 in a side wall of the seat body part, and an energy-absorbing means 10 in the associated side wall of the child-retaining means. The energy absorbing means 9 and 10 are provided with coupling means 11 and 12 respectively located at the bearing faces 13 and 14 of the respective side walls. This Figure also shows that the coupling means 11 are housed at 15 in the seat body part, and are so arranged that in the coupling position, the bearing faces 13 and 14 of the seat body part and child-retaining means are in perfect contact.

In a preferred arrangement, the coupling means 11 comprise slides or shoes having a downwardly converging profile, the larger opening of which faces upwards. The coupling means 12 comprise plates or feet which, when fitted in the shoes, co-operate with the latter to connect the energy absorbing means 9 and 10.

As can be seen in particular from FIGS. 2 to 4, the base 16 of each of the shoes has a hole 17, the periphery of which is adapted to co-operate with one of the ends of the corresponding member 9; the base 16 of each shoe also has a locating tab 18 intended to penetrate into the wall of the seat body part. The side faces 19 of each of these shoes each have two holes 20, the purpose of which will be explained below.

Referring now to FIGS. 5 to 7, it will be seen that the surface of each of the feet is raised in an upper central portion 21 and is provided there with a hole 22, the periphery of which is adapted to co-operate with one of the ends of the corresponding member 10. Each upper central portion also has a tab 23 wbhich is similar to the tab 18 and is adapted to penetrate into the wall of the child-retaining means.

It will be noted that the lower end or toe 24 of each of the feet is angled to facilitate their introduction into the corresponding shoes.

In the envisaged arrangement, the energy-absorbing means 9 and 10 comprise rods 27 and 28 housed in longitudinal channels 25 and 26 respectively. The channels 25 are formed in the side walls of the seat body part and the channels 26 are formed in the corresponding side walls of the child-retaining means.

As shown in FIG. 1, each rod 27 has at one of its ends a head 29 co-operating with the periphery of the hole 17 in a respective shoe, thus ensuring that the latter is retained, while at its other end, each rod 27 has a bush 30 which is of greater cross section than that of the rod. The bush 30 is housed in a widened portion 31 of the channel 25.

The bush 30 can be threaded onto the rod 27 and during this operation it can be used to force the tab 18 of the shoe to penetrate into the wall of the seat body part.

Similarly, each rod 28 is provided with a head 32, co-operating with the periphery of the hole 22 in a respective foot, and with a bush 33 similar to the bush 30. The bush 33 is housed in a widened portion 34 of the channel 26.

When the safety seat is in use in a vehicle, and the vehicle undergoes a sudden deceleration, a child in the seat will tend to strike the child-retaining means. Under the impact of the child's body the child-retaining means tends to separate from the seat body part, but is braked by the energy-absorbing means 9 and 10, the interconnected rods of which cannot leave the longitudinal channels 25 and 26, since the bushes 30 and 33 oppose their displacement by firm frictional engagement of the bushes with the channel walls.

When the child-retaining means are secured to the seat body part, that is to say when the feet are fitted into the shoes, it is necessary to ensure that the child retaining means does not become accidentally separated in the event of any sudden impact.

For this reason, the safety seat also includes a locking element at each of its sides between a shoe and a foot.

As can be seen particularly clearly in FIGS. 8 to 10, such a suitable locking element is constituted by a resilient strip 35 having two arms 36 and 37 bent at right-angles to each other. The arm 36 has holes 38 enabling it to be secured along a side face 19 of the shoe by means of, for example, rivets, not illustrated, which pass through the holes 38 and the holes 20 in the face 19. The arm 37, which is free and terminates in a grip 39 for manually operating the locking element, extends below the shoe.

These Figures also show that the arm 36 is provided with a tab 40 adapted to co-operate with one of two notches 41 formed in the lower portion of the foot. Also, referring more particularly to FIG. 10, it will be seen that, in the coupling position, the portion of the plate in which the notches 41 are formed extends out of the plane of the remainder of the foot, and that the lower portion of the foot comprises two curved zones 42, one of which is used to deflect the tab during coupling until the tab reaches the notch.

The two locking members provided on the safety chair are secured to the shoes in such manner that their operating grips 39 are located on the exterior of the chair. There is thus no risk of these grips hurting the child who will also find difficulty in reaching them and operating them at an inopportune moment.

To join the child-retaining means to the seat body part, all that is required is to bring the ends of the feet above the upper openings in the shoes and then to lower the child-retaining means by causng it to slide down along the seat body part to introduce the feet into the shoes. The locking elements of course become automatically effective as soon as the notches 41 in the plates move out from the bottom of the shoes.

Conversely, for the purpose of separating the child-retaining means from the seat body part, thrust is first applied to the operating grips 39 so as to withdraw the tabs 40 from the notches 41, and the child-retaining means is then lifted by sliding it up along the seat body part until the feet are withdrawn from the shoes.

Thus, it will be seen that the presence of the energy-absorbing means in no way interferes with connection or separation of the child-retaining means and the seat body part.

The safety seat in accordance with the invention is particularly efficient and, when the vehicle suddenly decelerates, the energy-absorbing means of the seat absorb practically all the kinetic energy of the child's body when it strikes the retaining means Whilst a preferred embodiment of the invention has been shown and described herein, it is to be understood that it is capable of further modifications without departing from the spirit and scope of the invention as defined in the appended claims.

We claim:

1. A child's safety seat comprising: a seat body part adapted to be firmly connected to a vehicle seat; a child-retaining means, the side walls of which bear against the side walls of the seat body part; and energy-absorbing means interposed between the seat body part and the retaining means for protecting a child in the seat in the event of sudden deceleration of the vehicle, said energy-absorbing means comprising at least two similar assemblies, each of which includes two energy-absorbing members, one of which members is housed in a side wall of the seat body part and the other in the corresponding side wall of the child-retaining means, each of said two members being provided with coupling means for coupling them together and said coupling means being located at the bearing faces of the associated side wall of the seat body part or child-retaining means.

2. A safety seat according to claim 1, including two of said assemblies superposed at each side wall of the seat.

3. A safety seat according to claim 1 in which said coupling means are so housed in the seat body part side wall and associated child-retaining means side wall that when the energy absorbing members of the seat body part are coupled to the associated energy absorbing members of the child-retaining means, the bearing faces of said side walls of the seat body part and of the child-retaining means are in close contact.

4. A safety seat according to claim 1 in which the respective coupling means for coupling the energy-absorbing members of each assembly comprise a shoe having a downwardly converging profile, the larger opening in which faces upwards, and a foot adapted to co-operate with the shoe.

5. A safety seat according to claim 4, in which the shoe and the foot are each provided with at least one tab which penetrates into the associated side wall of the associated seat body part or child-retaining means that carries the shoe or foot.

6. A safety seat according to claim 1 in which the energy-absorbing members of each assembly comprise two longitudinal channels, one formed in a side wall of the seat body part and the other in the corresponding side wall of the child-retaining means, and by two rods, each fitted in a respective one of the channels, one of the ends of each of said rods retaining a respective coupling means on the bearing face of the corresponding side wall, while the other end of each rod carries a bush of greater cross-section than that of the rod and housed in a widened portion of the corresponding channel.

7. A safety seat according to claim 4 in which at least some of the coupling means are provided with a locking element comprising a resilient strip having two arms bent substantially at right-angles to each other, one of said arms being secured along a side face of the corresponding shoe, whereas the other arm is free, terminates in a grip by which the locking means can be operated manually, and extends below said shoe, said first arm being provided with a tab adapted to co-operate with a notch formed in a lower portion of the foot, said lower portion being arranged to project from the slide and having a curved zone for deflecting the tab during coupling of the shoe and foot.

* * * * *